No. 668,178. Patented Feb. 19, 1901.
D. M. HARRISON.
PLOW FENDER.
(Application filed July 16, 1900.)
(No Model.)
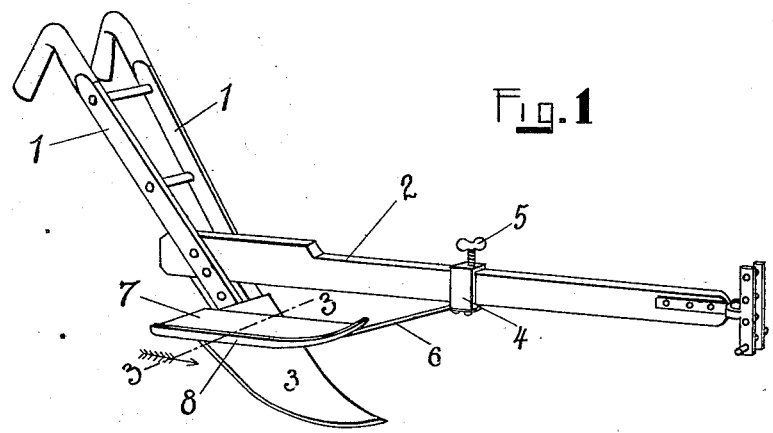
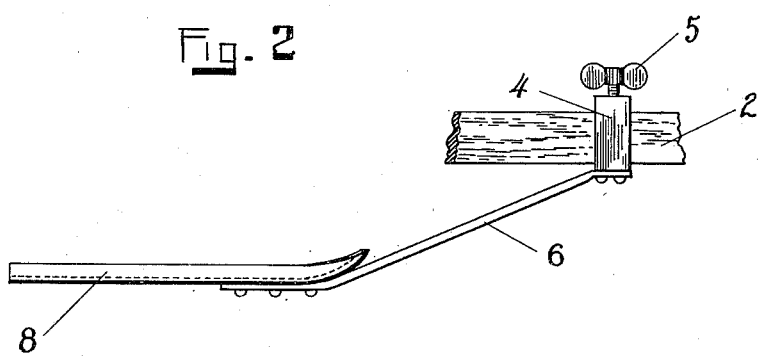
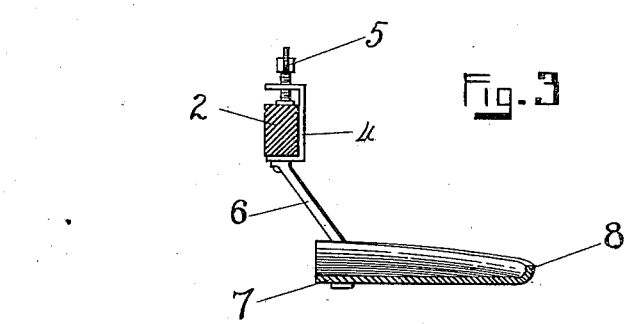
WITNESSES:
INVENTOR.
D. M. HARRISON
BY
ATTORNEY.

United States Patent Office.

DANIEL MARION HARRISON, OF SOLGOHACHIE, ARKANSAS.

PLOW-FENDER.

SPECIFICATION forming part of Letters Patent No. 668,178, dated February 19, 1901.

Application filed July 16, 1900. Serial No. 23,851. (No model.)

*To all whom it may concern:*

Be it known that I, DANIEL MARION HARRISON, a citizen of the United States, residing at Solgohachie, in the county of Conway and State of Arkansas, have invented certain new and useful Improvements in Plow-Fenders, of which the following is a full, clear, and exact description, reference being had to the accompanying drawings, forming a part hereof.

My invention has relation to improvements in plow-fenders; and it consists in the novel arrangement and combination of parts more fully set forth in the specification and pointed out in the claims.

In the drawings, Figure 1 is a perspective view of an ordinary plow with my fender attached. Fig. 2 is a detached side elevation of the fender, and Fig. 3 is a transverse section of the fender-board on line 3 3 of Fig. 1.

The object of my invention is to provide a plow with a fender capable of performing superior work, thoroughly disintegrating the soil thrown up by the plow-blade and permitting it to fall in a pulverized form around the roots of plants undergoing cultivation, and preventing any heavy soil, clods, &c., from being thrown on the plants to crush them.

My present fender instead of being arranged parallel to the plane of the plow-blade is mounted in a plane substantially at right angles thereto and in detail may be described as follows:

Referring to the drawings, 1 1 represent the handle-bars of the plow, 2 the plow-beam, and 3 the blade. Adapted to be mounted adjustably along the plow-beam is a clamp 4, secured permanently when once adjusted by a set-screw 5, the base of the clamp having bolted or otherwise secured thereto a rearwardly-extending arm 6, the end of which is riveted to or made integral with a fender-board 7, having an outer longitudinal turned-up edge 8, the rear end of the fender being directly supported by the upper edge of the plow-blade 3. The forward end of the fender is curved upward, whereby any bruising of the plant is avoided.

The fender may be made of metal or wood, and when made of the latter the edge thereof corresponding to the turned-up edge 8 of the metal board should be made well rounded to prevent bruising of the plants. I make the entire attachment, however, preferably of metal.

The fender is adjustable, as is obvious, and being mounted in a plane substantially horizontal the soil as it is thrown up by the plow-blade must necessarily pass over the fender, becoming thereby fully disintegrated.

The present fender answers the same purpose as the prevailing fenders now used, which are mounted by the side of the plow-blade and substantially in the same plane therewith; but the work performed by my present improvement is superior to that of the vertical fenders referred to.

It is apparent that I may alter the details of construction of the present device without departing from the spirit of my invention.

Having described my invention, what I claim is—

1. A plow-fender comprising a plate having an outer longitudinal turned-up edge, a forward curved end, an arm carried thereby, a clamp at the outer end of said arm, the whole being adapted to be secured to the plow-beam and the rear end of the fender supported by the plow-blade, substantially as set forth.

2. In a plow, a fender having one end secured to the plow-beam, and the opposite end supported by the plow-blade, the fender being disposed in a plane substantially at right angles to the plane of the plow-blade, substantially as set forth.

In testimony whereof I affix my signature in presence of two witnesses.

DANIEL MARION HARRISON.

Witnesses:
 E. H. TODD,
 SAM. TODD.